United States Patent
Horr et al.

(10) Patent No.: US 9,430,679 B2
(45) Date of Patent: Aug. 30, 2016

(54) DISPLAY DEVICE AND METHOD AIMING TO PROTECT ACCESS TO AUDIOVISUAL DOCUMENTS RECORDED IN STORAGE MEANS

(75) Inventors: Olivier Horr, Rennes (FR); Pierre Salmon, Thorigne Fouillard (FR)

(73) Assignee: Thomson Licensing (FR)

( * ) Notice: Subject to any disclaimer, the term of this patent is extended or adjusted under 35 U.S.C. 154(b) by 626 days.

(21) Appl. No.: 12/653,225

(22) Filed: Dec. 10, 2009

(65) Prior Publication Data

US 2010/0169983 A1   Jul. 1, 2010

(30) Foreign Application Priority Data

Dec. 19, 2008   (EP) ...................................... 0858824

(51) Int. Cl.
*G06F 21/62* (2013.01)
*G06F 21/84* (2013.01)

(52) U.S. Cl.
CPC ........... *G06F 21/84* (2013.01); *G06F 21/6218* (2013.01); *G06F 2221/2137* (2013.01)

(58) Field of Classification Search
USPC ....................................................... 726/27
See application file for complete search history.

(56) References Cited

U.S. PATENT DOCUMENTS

| 5,615,373 A | 3/1997 | Ho |
| 7,058,814 B1 | 6/2006 | Zimmerman |
| 2002/0138691 A1 | 9/2002 | Yamamoto et al. |
| 2003/0184653 A1 | 10/2003 | Ohkubo |
| 2003/0220974 A1 | 11/2003 | Curran et al. |
| 2004/0193639 A1* | 9/2004 | Bergman et al. ......... 707/103 R |
| 2004/0205286 A1 | 10/2004 | Bryant et al. |
| 2004/0210608 A1 | 10/2004 | Lee et al. |
| 2005/0044066 A1 | 2/2005 | Hooper et al. |
| 2005/0086231 A1* | 4/2005 | Moore .......................... 707/100 |
| 2005/0262083 A1 | 11/2005 | Brown |
| 2006/0143714 A1* | 6/2006 | Peterson et al. ................ 726/26 |
| 2006/0206487 A1 | 9/2006 | Harada et al. |
| 2006/0215984 A1* | 9/2006 | Nesvadba et al. ............... 386/46 |
| 2007/0038669 A1* | 2/2007 | Davis ......................... 707/104.1 |
| 2007/0236729 A1 | 10/2007 | Yoda |

(Continued)

FOREIGN PATENT DOCUMENTS

| CA | 2560705 | 10/2005 |
| CN | 1917606 | 2/2007 |

(Continued)

OTHER PUBLICATIONS

Markvart et al: "Sizing and Reliability of Stand-Alone PV Systems" 12th. E.C. Photovoltaic Solar Energy Conference, Amsterdam, The Netherlands, Apr. 11-15, 1994; [Proceedings of the International Photovoltaic Solar Energy Conergy], Bedford: H.S.Stephens & Associates, GB vol. CONF. 12, Apr. 11, 1994, pp. 1722-1724) xp001137101 ISBN: 978-0-9521452-4-0.

*Primary Examiner* — Benjamin Lanier
(74) *Attorney, Agent, or Firm* — Jack Schwartz & Associates, PLLC (57) ABSTRACT

A display device and method aiming to protect access to audiovisual documents recorded in a memory. The display device includes a setting device for setting a masking threshold of the documents. The display device further includes a masking device for masking recorded documents the seniority of which in the memory is greater than the masking threshold.

21 Claims, 5 Drawing Sheets

(56) References Cited

U.S. PATENT DOCUMENTS

| | | |
|---|---|---|
| 2008/0008456 A1 | 1/2008 | Buttars et al. |
| 2008/0010324 A1* | 1/2008 | Stebner et al. ............... 707/204 |
| 2008/0285080 A1 | 11/2008 | Matsushita |
| 2009/0132489 A1 | 5/2009 | Li |

FOREIGN PATENT DOCUMENTS

| | | |
|---|---|---|
| CN | 101026822 | 8/2007 |
| EP | 1589444 | 10/2005 |
| EP | 1785896 | 5/2007 |
| GB | 2454001 | 4/2009 |
| JP | H2795892 | 10/1995 |
| JP | 11112915 | 4/1999 |
| JP | 2002215574 | 8/2002 |
| JP | 200304440 | 2/2003 |
| JP | 2003044226 | 2/2003 |
| JP | 200432063 | 1/2004 |
| JP | 2004320632 | 11/2004 |
| JP | 200877236 | 4/2008 |
| JP | 2008134992 | 6/2008 |
| JP | 2008283349 | 11/2008 |

* cited by examiner

DISPLAY DEVICE AND METHOD AIMING TO PROTECT ACCESS TO AUDIOVISUAL DOCUMENTS RECORDED IN STORAGE MEANS

This application claims the benefit, under 35 U.S.C. §119, of European Patent Application No. 0858824 of 19 Dec. 2008.

1. Field of the Invention

The invention relates to a display device, particularly a digital camera, aiming to protect access to audiovisual documents recorded in storage means according to their seniority. The invention also relates to a display method aiming to protect access to audiovisual documents recorded in a storage space according to their seniority.

2. Background of the Invention

Electronic devices enable storage of data, particularly audiovisual data, coming from varied contexts. The display of this data can itself be carried out in different contexts, the use of electronic devices being increasingly nomadic. Problems of confidentiality can therefore arise.

For example, the use of a digital camera can be considered in a professional and in a private context. It can be disturbing to know that photos taken in a professional context could be viewed subsequently in a private context. It can also be a cause for concern in the case where the device is lent to a third party in that said third party can browse the memory of the device and view not only the photos immediately taken but also all of the audiovisual documents contained in the memory of the device.

For example, the use of a USB key associated or not associated with a player able to restore music or video files can be imagined. It can be a cause for concern that previously recorded private documents can be viewed by a third party when the key is made available to him to exchange a professional document only just recorded or to be recorded.

It has already been proposed to protect access to data by masking it using for example the hidden files method by Windows. But this masking operation, presents the double disadvantage of having to define the masking properties of the documents prior to the possible display of said documents and of having to define the masking for a type of use for example masking the private data from a use of the device in the professional context.

There are also USB keys that offer two partitions, one public and one for which access is subject to a password. The key can then contain, securely, confidential data. Here again, the masking of the documents must be defined at the time of recording of said documents in one of the two partitions. Here again, the masking protects one context with respect to another in a privileged manner, for example the private context with respect to the professional context.

Finally, there is a method for managing licenses associated with audiovisual documents in such a manner as to protect access to said documents. This method is for example used in Video On Demand (VOD) services. The rights to an audiovisual document are purchased for a certain period. When this period expires, the document is no longer available for display. This system functions with proprietary encryption formats, the audiovisual documents are encrypted and a license is required to view the documents. However, in the case of video on demand, the document is generally not recorded in the storage means of the device, access to the audiovisual document is remote. Only the license file is saved in the storage means. Moreover, in this method, any user in possession of a valid license can access said documents but this user can in no circumstances modify the protection of said documents or reactivate the license after expiry of the period.

The invention provides a response to this problem of confidentiality of the documents recorded in the memory of an electronic device. The proposed solution also has the advantage of not favouring one context over another and the advantage of being able to be implemented before or after the recording of the documents in the memory of said device.

3. SUMMARY OF THE INVENTION

The display device aiming to protect access to audiovisual documents recorded in the storage means in accordance with the invention comprises the means for setting a masking threshold for said documents and the means for masking recorded documents the seniority of which in said storage means is greater than said threshold.

A threshold defines the seniority from which point it is preferable that the documents be masked.

In an embodiment of the invention, the threshold can be fixed at one day, only audiovisual documents dating from the day can be displayed, the older documents in the memory of the device will be masked. For example, a user of a camera can make professional use of his camera on a day J and private use the next day referred to as day J+1. When he tries to display the photos taken in a private context, only the photos taken on the day called J+1 will be visible, the photos of the preceding day called day J taken in a professional context will be masked. In the same way, if the following day called J+2, he finds himself in his professional context, the photos taken in the private context for which the seniority becomes greater than the threshold fixed at one day, will also be invisible in the professional context. The user must adjust the masking threshold in such a way as to properly separate the different uses. Thus, the device in accordance with the invention has the advantage of not privileging one context with respect to another as the documents are not masked according to their type which is often characterized by a private or professional context amongst others, but according to their seniority. In the previous embodiment, the user back again in his professional context on the day called J+2 can also set the parameter of the masking threshold of his documents to three days. In this case, he can render visible the photos of the professional context taken on day J, the photos dated day J+1 associated with the private context and the photos taken on day J+2 associated with the professional context.

The masking of documents is uniquely conditioned by the seniority with respect to the threshold and is not conditioned by a property of confidentiality or a context defined at the time of recording of said documents. Thus, the threshold can be adjusted and has the advantage of being able to be fixed before or after the recording of the documents in the memory of said device.

In addition, according to a preferred embodiment, the device advantageously comprises means for deactivating said setting, the deactivation enabling a display of all the documents recorded.

If the user wants to sort or delete the documents recorded in said storage means of the device, he needs to view the totality of said documents without the restriction of masking. Thus, he can deactivate said setting of the masking threshold. However with a view to protecting the confidentiality of the documents, this deactivation functionality is preferentially reserved for a user called principal user.

Thus said deactivation means are preferentially protected by an access code.

According to the embodiments, the access code can be a series of alphanumeric characters, an activation series of keys of the device or even a simultaneous combination of keys of the device.

Furthermore, said access code is preferentially accessible to a principal user.

Said principal user can be defined as being the owner of the device or a privileged user who is in possession of the access code protecting the deactivation of the masking threshold. Thus, said principal user controls the display of all audiovisual documents recorded in the storage means of the device, the setting of the masking threshold and the deactivation of said setting.

According to a specific embodiment, said means for setting the masking threshold of the documents enables at least one delay or one date to be initialized.

According to one embodiment, the masking threshold can be a determined delay in the form of hours-days, for example one day. According to another embodiment, the masking threshold can be a determined date in the form day-month-year for example 4 Dec. 2008. The audiovisual documents recorded are masked if their seniority is greater than the delay or the date defining the masking.

In another embodiment, a first threshold defining a maximum value and at least a second threshold defining a minimum value, can be set in the form of a delay or date. The recorded audiovisual documents are masked if their seniority is greater than the maximum value and less than the minimum value. Thus this embodiment advantageously enables a period to be defined for which the documents will be masked. In this embodiment, the user of the camera of the embodiment shown can set parameters for a first threshold at one day and a second threshold at two days. In this case, he can render visible the photos of the professional context taken on day J, mask the photos dated day J+1 associated with the private context, and render visible the photos taken on day J+2 associated with the professional context.

Said seniority of documents in the storage means is preferentially relative to the date of recording on said storage means.

Thus, metadata are associated with said documents, these metadata are data that describe an item of data or a resource such as a document, an image, an mp3 file. During the display of properties in Windows, the system presents the metadata of said document, that is to say a set of information such as document type, size, modification date, security, sharing. These are the metadata of the operating system. Each document type can also contain metadata. Thus, the EXIF, IPTC and XMP metadata are associated with photographic documents and contain information such as the device model, the orientation, the resolution, the date and time of the shot, the date and time of the modification of the photo, etc.

According to one embodiment, the documents are recorded in the storage means by the user, the metadata of the modification date associated with said document by the operating system is then modified and updated with the time and date of recording of said document in the device. This date defines the seniority of the document.

According to another embodiment, the documents of the device are digital photographs with metadata also of EXIF type: the date and time of the shot defining the seniority of the document.

In these two embodiments, the date and time of the device defines the seniority of said documents but can also intervene in the comparison between the seniority and the threshold in the case where it is a delay. Thus, it can be useful to lock the modification of the date and the time of the device when the masking threshold is activated.

According to a first embodiment, said means for setting the masking threshold of documents fix said threshold prior to the recording of said documents in said storage means.

Thus, the user of the camera of the embodiment shown, can fix the delay at one day a priori, before taking photos on day J+1 in such a manner as to preserve the confidentiality of the photographic documents of the professional context.

According to a second embodiment, said means for setting the masking threshold of the documents fix said threshold prior to the display of said documents in said storage means.

In this embodiment, the setting of the threshold can be prior to the recording as in the first embodiment.

In this embodiment, the setting of the threshold can also advantageously be after the recording of said documents in said storage means. Thus, the user of the camera of the embodiment shown, can after having taken the photos on day J+2 fix the delay at three days a posteriori in such a manner as to be able to display the photographs from the professional context of the day J and the day J+2.

The storage means are preferentially of the mass storage type such as a USB peripheral or a memory card.

USB peripheral is understood to mean a USB key, MP3 player able to restore music documents or MP4 player able to restore audio and video files. Furthermore, memory card is understood to be flash memory such as Compact Flash, Memory Stick, mini SD, micro SD and xD format. Mass storage is equally understood to be for example, and in a non-exhaustive manner, optical disks for example in DVD format, mini DV supports, and hard disks.

According to a first embodiment, the display device is preferentially an audio recorder, still picture camera, digital camcorder or professional video camera.

According to a second embodiment, the display device can also be a personal computer, that comprises recording and reading means, associated with a USB key, that also comprises means for storing and means for masking the documents.

The display device can advantageously comprise a continuous display mode for said documents. In this display mode of said recorded and non-masked documents, the display means browse the storage means in a continuous and looped manner.

Thus, the user of the still picture camera of the embodiment shown, can after having taken the photos on day J+2, fix the delay at one day. In this embodiment, he can begin by displaying the most recent photograph of the day J+2, namely the one with the least seniority, then continuously browse the memory of the device according to the increasing seniority of the photographs. When the seniority of the photograph to be displayed reaches the day J+1, the photograph will be masked and likewise for the photographs of the day J. The memory is browsed in a loop, thus after the photograph with the greatest seniority, the document with the least seniority is displayed. The latter is not masked and will be displayed. In this embodiment, the user can advantageously display in a loop only the photos of the day.

The invention also relates to a display method aiming to protect access to audiovisual documents recorded in a storage space. The method comprises the steps of setting a masking threshold of said documents and the steps of masking recorded documents for which the seniority in said storage space is greater than said threshold.

4. BRIEF DESCRIPTION OF THE DRAWINGS

The invention will be better understood and illustrated by means of non-restrictive embodiments and advantageous implementations, with reference to the accompanying drawings, wherein.

5. DETAILED DESCRIPTION OF DETAILED EMBODIMENTS

Figure 1:
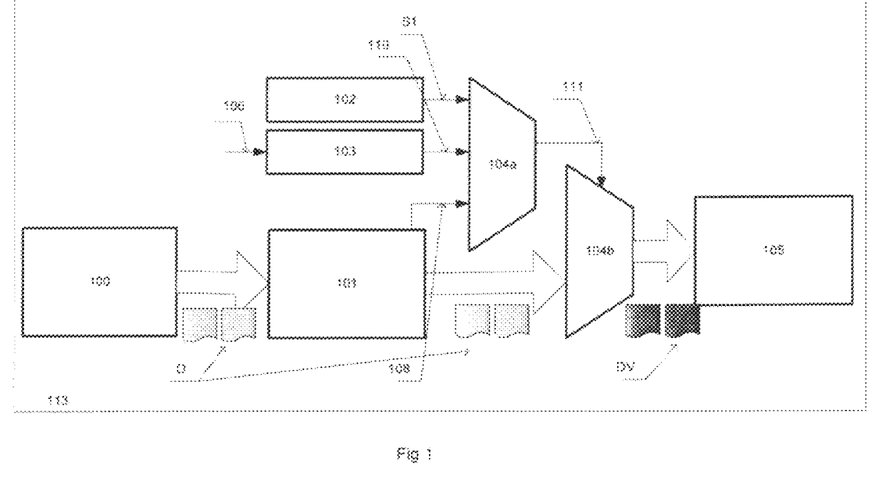
FIG. 1 shows a block diagram of a display device preferentially of the still picture camera type.

FIG. 1 shows a block diagram of a display device, preferentially of the still picture camera type 113.

In an embodiment of the invention of the still picture camera type 113, documents such as digital photographs D are captured by the recording means 100 of the device. The photographs D are stored in the storage means 101. In this embodiment the storage means 101 are preferentially memory cards for example flash memory with formats such as Compact Flash, Memory Stick, mini SD, micro SD or xD or optical disks for example in the DVD format, or mini DV or even hard disks.

The date of their recording in the storage means 101 defines the seniority 108 of the documents D. Means for setting 102 enable a masking threshold S1 of said digital photographs D to be fixed. Means for deactivating 103 said setting are protected by an access code 106 that can be accessed by a principal user. The seniority 108 of said photographs D, the masking threshold S1 and the level of the deactivation 110 enable, at a first level, means for masking 104*a* to define a masking command 111 for a second level of means of masking 104*b*. This second level of means of masking 104*b* controls the visualization of visible documents DV the seniority 108 of which is greater than said masking threshold S1 in the display means 105 of the still picture camera 113.

Figure 2:
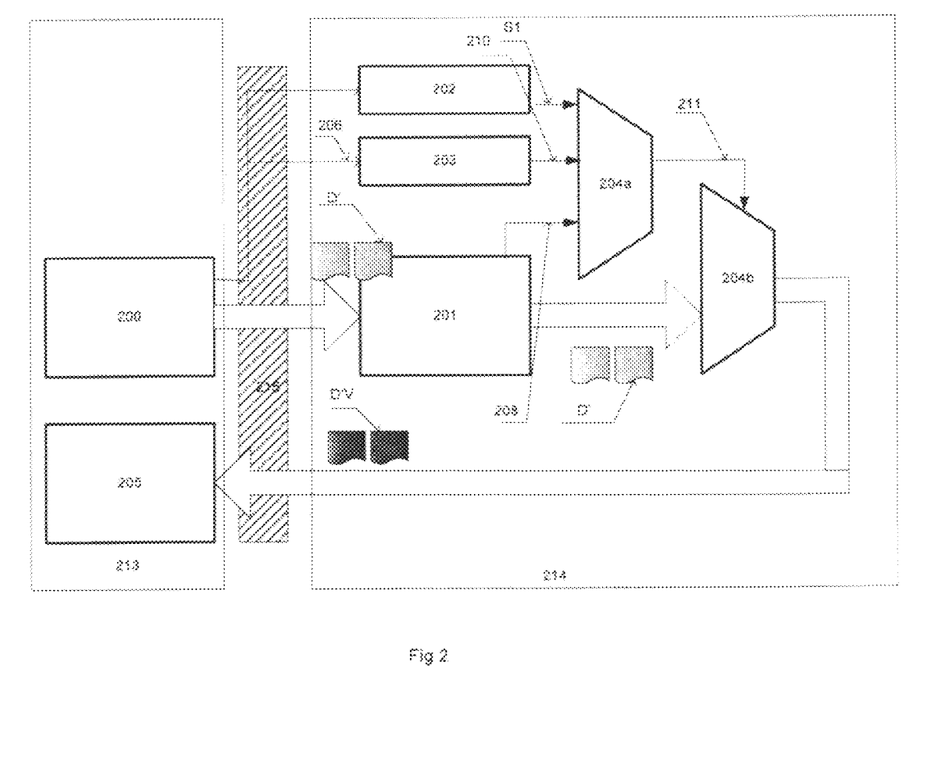
FIG. 2 shows a block diagram of a display device preferentially of the USB peripheral mass storage type associated with a personal computer.

FIG. 2 shows a block diagram of a display device preferentially of mass storage of USB peripheral type 214 associated with a personal computer 213.

In a second embodiment of the invention where a USB key 214 is associated with a personal computer 213, the writing means 200 enable the documents D' to be recorded using a USB interface 215. These documents D' are recorded in the storage means 201 of the USB key 214. In this embodiment, the storage means 201 are preferentially a flash memory component internal to the USB key 214. In this embodiment, the documents D' can be digital photographs but also for example, and in a non-exhaustive manner, audio or video files or office documents.

The date of their recording defines the seniority 208 of said documents D'. A masking threshold S1 is stored in the means for setting 202 of the USB key 214. The threshold S1 can be accessed in write mode by the writing means 200 of the personal computer 213 by using the USB interface 215. The deactivation means 203 of said setting are protected by an access code 206 that can be accessed by a principal user via the USB interface 215. The seniority 208 of said documents D', the masking threshold S1 and the level of the deactivation 210 enable a first level of masking means 204*a* to define a masking command 211 for a second level of masking means 204*b*. This second level of masking means 204*b* controls the read access to these visible documents D'V, for which the seniority 208 is greater than said masking threshold S1, by the reading means 205 of the personal computer 213 always via the USB interface 215.

Figure 3:
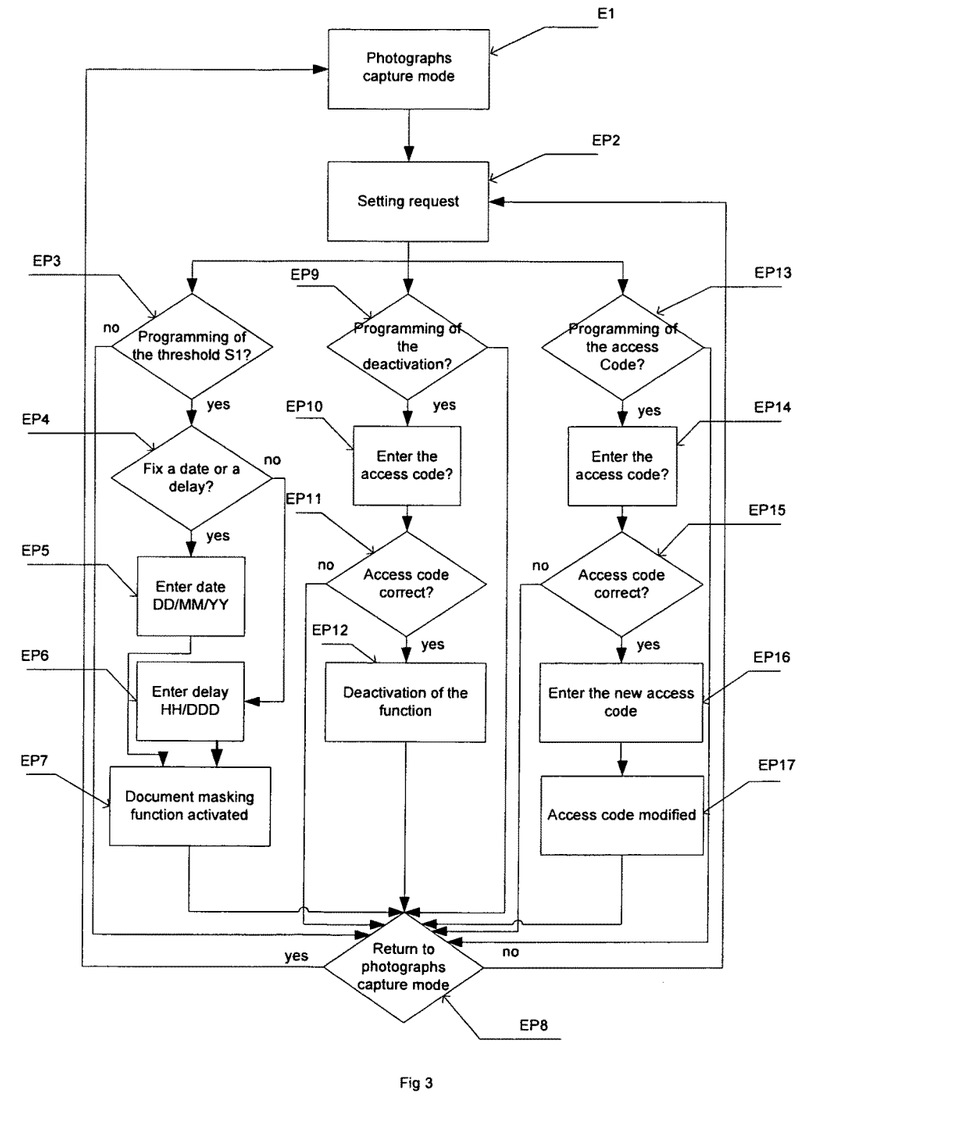
FIG. 3 shows a method advantageously implemented in the parameter settings according to specific embodiments of the invention.

FIG. 3 shows a method implemented in the setting means according to specific embodiments of the invention for example the still picture camera 113. Said method thus describes an algorithm that can advantageously be implemented via the user interface of the still picture camera 113.

The photographs capture mode state E1 is advantageously defined as the initial state. From the initial state E1, a setting request step EP2 can be accessed. This step EP2 further enables access to different programs for parameters such as the masking threshold S1, the deactivation of the masking function or the access code protecting the deactivation of said function.

Thus, during a test EP3 of threshold programming, the user is asked whether the parameter to be programmed is the masking threshold. If the result of the test EP3 is negative, a test EP8 of return to the photographs capture mode is reached. If the result of the test EP3 is positive, a test EP4 analyzes whether the setting of the threshold enables a date or a delay initialized. If the result of the test EP4 is the initialisation of a date (yes), a step EP5 for entering a date advantageously defined in the format DD/MM/YY is attained. If the result of the test EP4 is the initialisation of a delay (no), a step EP6 for entering a delay advantageously defined in the format HH/DDD is attained. After these 2 steps EP5 and EP6 of possible entry of a threshold, a step EP7 activates the masking function of the documents then a test EP8 of return to the photographs capture mode is attained. According to a specific embodiment, more than one delay or date respectively defining more than one threshold can be initialised: the test EP4, the steps EP5 and EP6 can advantageously be duplicated in this case.

Alternatively, during a test EP9 of programming of the deactivation, the user is asked whether the parameter to be programmed is the deactivation of the masking function. If the result of the test EP9 is negative, a test EP8 of return to the photographs capture mode is reached. If the result of the test EP9 is positive, a step EP10 for entering an access code advantageously protecting the deactivation of the masking function is attained. According to the embodiments, the access code can be a series of alphanumeric characters, an activation series of keys of the device or even a simultaneous combination of keys of the device. A test EP11 checks whether the access code is valid. If the result of the test EP11 is positive, a step EP12 deactivates the document masking function then a test EP8 of return to the photographs capture mode is attained. If the result of the test EP11 is negative, the test EP8 of return to the photographs capture mode is attained without passing by the step EP12 of deactivation of the masking function.

Alternatively, during a test EP13 of programming of the access code protecting the deactivation of document masking, the user is asked whether the parameter to be programmed is the access code protecting the deactivation of the masking function. If the result of the test EP13 is negative, a test EP8 of return to the photographs capture mode is reached. If the result of the test EP13 is positive, a step EP14 for entering the access code is attained. A test EP15 checks whether the access code is valid. If the result of the test EP15 is positive, a step EP16 enables a new access code to be entered. A step EP17 is then reached that activates the new access code followed by a test EP8 of return to the photographs capture mode. If the result of the test EP15 is negative, the test EP8 of return to the photographs capture mode is reached without modification to the access code.

According to a specific embodiment of the invention, the programming of the date and time of the device can be protected by the access code: a branch in the setting algorithm can advantageously be added to satisfy this embodiment.

During the test EP8, the user is asked if he is returning to the photographs capture mode state E1 or if he is remaining in the setting request step EP2.

The method shown in FIG. 3 thus describes an algorithm that can advantageously be implemented in the setting means of the device according to specific embodiments of the invention.

Figure 4:
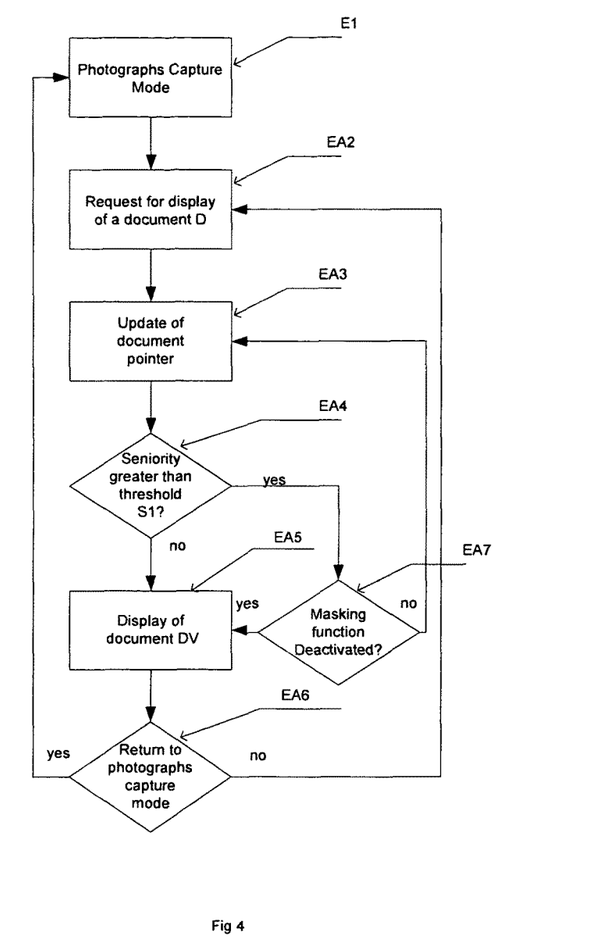
FIG. 4 shows a method advantageously implemented in the display of said documents according to specific embodiments of the invention.

FIG. 4 shows a method advantageously implemented in the display of said documents according to specific embodiments of the invention for example the still picture camera 113. Said method thus describes an algorithm that can advantageously be implemented by using the user interface means of the still picture camera 113.

The photographs capture mode state E1 is advantageously defined as the initial state. From the initial state E1, a step EA2 for requesting the display of a document recorded in the storage means can be accessed. After this step EA2, a step EA3 is reached for updating a list pointer enabling access on one hand to the documents recorded in the storage means 101, 201, 501 and on the other hand to the metadata associated with said documents D. Among these metadata, the seniority 108, 208 of the document D is found. In the USB key 214 and personal computer 213 embodiment of the invention, the metadata are those of the operating system. In the camera embodiment 113 the metadata are those, for example EXIF, associated with the photographic documents D.

Next, during a test EA4, the seniority of the document D, whose display is requested, is checked to see whether it is greater than the masking threshold S1 of the display function. If the result of the test EA4 is negative, the document DV is not masked and a step EA5 enables the display of the document. If the result of the test EA4 is positive, a test EA7 checks whether the masking function is deactivated. If the result of the test EA7 is positive, the document DV is not masked, a step EA5 is also reached enabling the display of the document. If the result of the test EA7 is negative, the document is masked DM while the function is activated, there is then a return to the step EA3 for updating the document pointer. According to a specific embodiment, the pointer to the list of the recorded documents D can advantageously be continuously updated, in a loop, thus authorising the display of the first non-masked document DV in the list.

After the step EA5 of display of the document DV, a test EA6 of return to the photographs capture mode is reached. During the test EA6, the user is asked if he is returning to the photo capture state E1 or if he is remaining in the step EP2 and requests the display of a new document D.

The method shown in FIG. 4 thus describes an algorithm that can advantageously be implemented in the display means 105 of the device according to specific embodiments of the invention.

Figure 5:
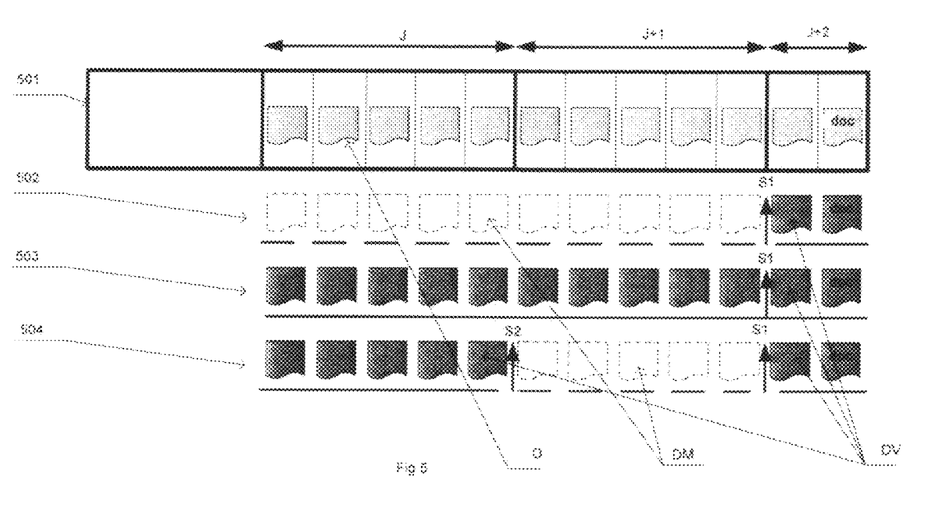
FIG. 5 illustrates the masking principle of the documents for the embodiment shown according to specific embodiments of the invention.

FIG. 5 illustrates the masking principle of the documents D for the embodiment described above according to specific embodiments of the invention.

A user uses his camera on day J in a professional context, on day J+1 in a private context and on day J+2 again in a professional context. He wants to protect the confidentiality of the photographs of one context with respect to another in different manners. FIG. 5 shows, according to the setting modes of the masking threshold or thresholds S1 S2, the deactivation of the document masking function, how to render the documents D stored in the memory of the camera 113 visible or not.

The state of the memory 501 of the still picture camera 113 of the user is represented on day J+2: It contains documents D for which the seniority is relative to day J, to day J+1 and to day J+2.

In the setting mode 502, a masking threshold S1 is fixed at one day and the masking function is active. In the professional context of day J+2, the photographs DM dated day J or J+1 the seniority of which is greater than the masking threshold S1 fixed at one day are masked, the other photographs DV are visible.

In a second parameter setting mode 503, a masking threshold S1 is still fixed at one day but the masking function is deactivated by the user. In the professional context of day J+2, all photographs DV dated day J or day J+1 or day J+2 are visible. The user can for example sort or delete any one of the photographs contained in the memory of the device.

In a specific embodiment 504 of the invention, a first masking threshold S1 defines a maximum value and a second masking threshold S2 defines a minimum value and the documents are masked if their seniority is greater than the maximum value S1 and less than the minimum value S2. The setting mode 504 thus defines a masking threshold S1 fixed at one day, a masking threshold S2 fixed at two days and the activation of the masking function. In the professional context of day J+2, the photographs DM dated day J+1 the seniority of which is greater than the masking threshold S1 fixed at one day and less than the masking threshold S2 fixed at two days are masked. The photographs DV of the professional context dated day J+2 the seniority of which is not greater than the masking threshold S1 are visible. The photographs DV of the professional context dated day J the seniority of which is not less than the masking threshold S2 are also visible.

Furthermore, the different parameters can be programmed independently of the documents D contained in the memory of the device 101, 201, 501. Thus, the confidentiality of the documents D can advantageously be modified before or after the recording of the documents.

What is claimed:

1. An apparatus for protecting access to stored data, the apparatus comprising:
   a storage for storing said data and metadata associated with the data, the storage including:
   a masking range for said data, said masking range identifying a time period during which data obtained within the identified time period and stored in said storage is masked,
   wherein the metadata includes a time of recording of said stored data and, if the time of recording is outside said masking range, said stored data is unmasked, confidentiality of masked data recorded in said storage having a time of recording within the masking range is protected by:
   hiding the masked data recorded in said storage from display, updating a data pointer to point to a first non-masked data of a list of stored data recorded after the masked data and, authorizing display of the first non-masked data recorded in said storage on the list.

2. The apparatus according to claim 1, further comprising a deactivating device for deactivating said setting wherein the deactivation enables a display for a user to view and to access all the recorded data.

3. The apparatus according to claim 2, wherein said deactivating device is protected by an access code.

4. The apparatus according to claim 3, wherein said access code is accessible to a principal user.

5. The apparatus according to claim 1, wherein the storage includes data enabling at least one delay or one date to be initialized.

6. The apparatus according to claim 1, wherein said time of recording of the data in the memory defines a date of recording on said memory.

7. The apparatus according to claim 1, wherein the range is fixed prior to the recording of said data in said memory.

8. The apparatus according to claim 1, wherein the range is fixed prior to the display of said data in said memory.

9. The apparatus according to claim 1, wherein said memory is of the mass storage type including a USB peripheral and a memory card.

10. The apparatus according to claim 1, wherein the apparatus is one of an audio recorder, still picture camera, digital camcorder and a professional video camera.

11. The apparatus according to claim 1, further comprising a display device for displaying said recorded and non-masked data continuously in a loop.

12. A method of protecting access to data stored in a storage space comprising:

storing said data and metadata associated with said data in said storage space;

setting a masking range for said data stored in the storage space, said masking range identifying a time period during which data obtained within the identified time period and stored in said storage space is masked, masking said data stored in said storage space when a time of recording of said data is within said masking range and unmasking said data stored in said storage space when the time of recording is outside said masking range, wherein said metadata associated with said data includes said time of recording of said stored data, wherein the masking of said data stored in the storage space protects confidentiality of masked data stored in the storage space by:

hiding the masked data recorded in the storage space from display, updating a data pointer to point to a first non-masked data of a list of stored data recorded after the masked data, and authorizing display of the first non-masked data recorded in said storage space on the list.

13. The method according to claim 12, further comprising deactivating said setting by a deactivating device wherein the deactivation enables viewing of and access to all the recorded data.

14. The method according to claim 13, further comprising protecting said deactivating device by an access code.

15. The method according to claim 14, wherein said access code is accessible to a principal user.

16. The method according to claim 12, wherein the masking range includes at least one delay or one date to be initialized.

17. The method according to claim 12, wherein said time of recording of the data recorded in the storage space defines a date of recording on said storage space.

18. The method according to claim 12, wherein the masking range is fixed prior to the recording of said data in said storage space.

19. The method according to claim 12, wherein the masking range is fixed prior to the display of said data recorded in said storage space.

20. The method according to claim 12, wherein said storage space is of the mass storage type including one of a USB peripheral and a memory card.

21. The method according to claim 12, further comprising displaying said recorded and non-masked data continuously in a loop on a display device.

* * * * *